May 10, 1960 R. L. CALDWELL 2,936,090
EGG CRATE OR COLLAPSIBLE CONTAINER
Filed Jan. 14, 1958 2 Sheets-Sheet 1
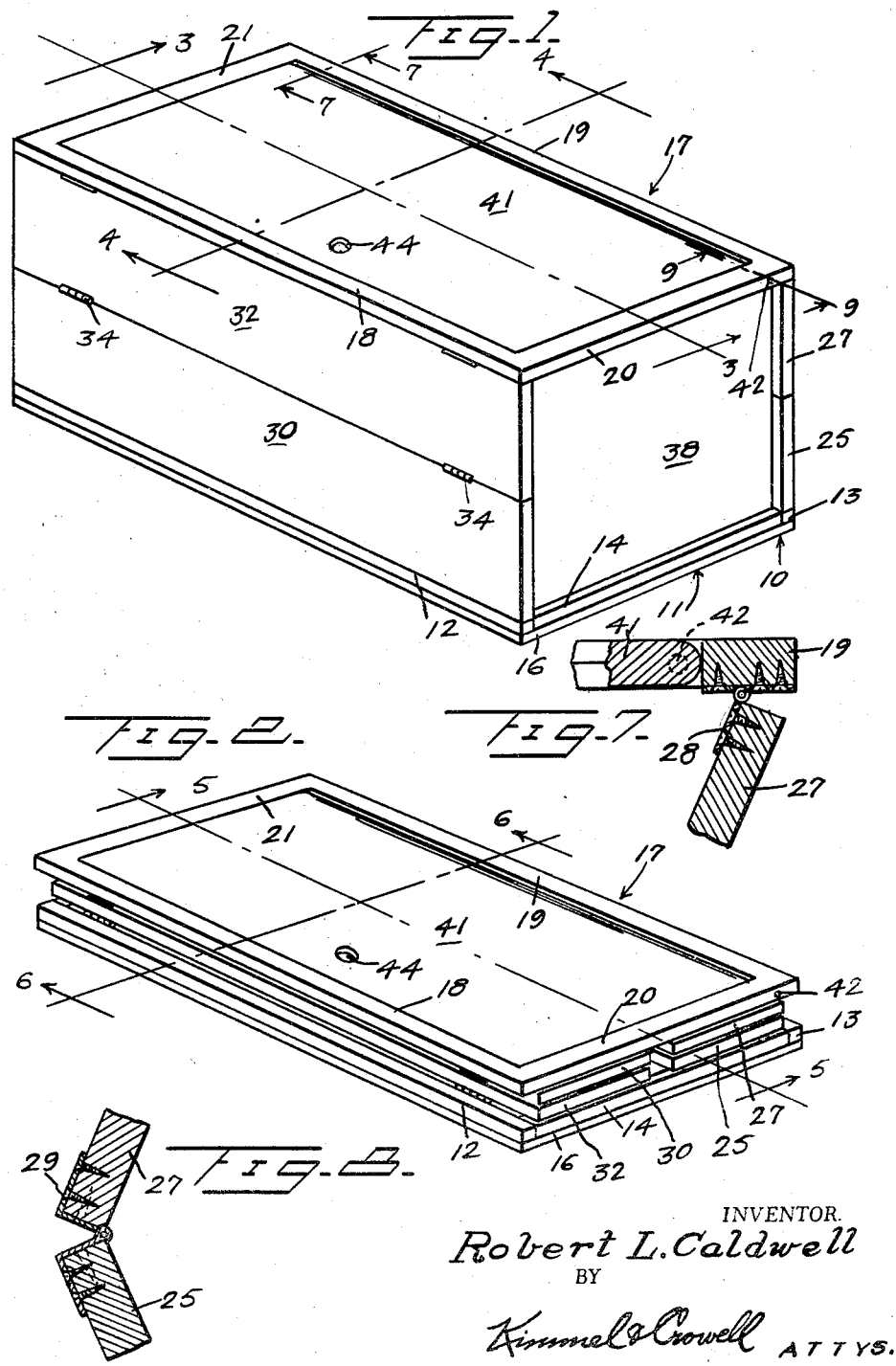
INVENTOR.
Robert L. Caldwell
BY
Kimmel & Crowell ATTYS.

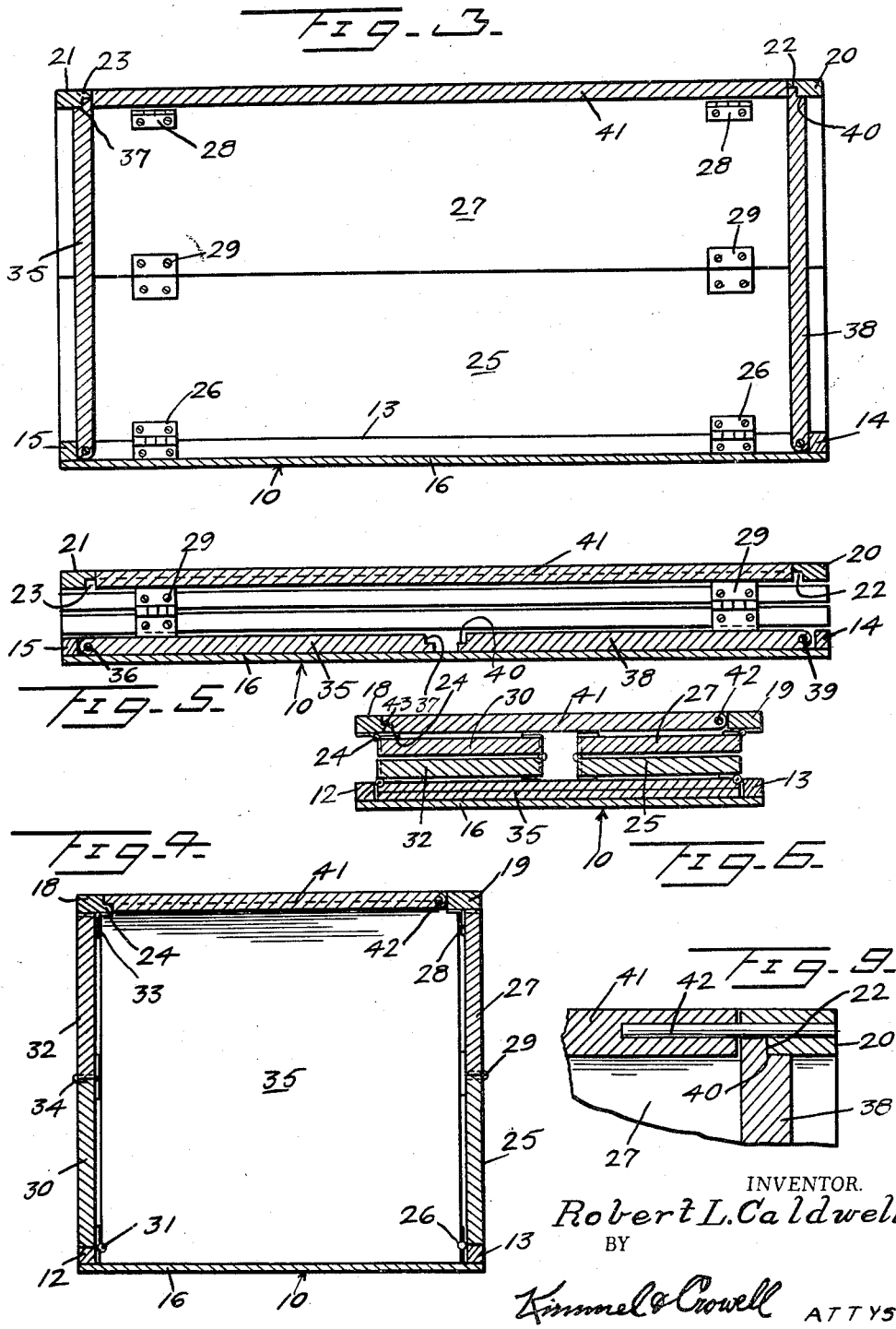

United States Patent Office 2,936,090
Patented May 10, 1960

---

2,936,090

EGG CRATE OR COLLAPSIBLE CONTAINER

Robert L. Caldwell, Sourlake, Tex., assignor of one-third to Roy Luther Caldwell and one-third to Rual Bonner Caldwell, both of Mesquite, Tex.

Application January 14, 1958, Serial No. 708,876

1 Claim. (Cl. 217—15)

The present invention relates to a collapsible crate, or folding case or box adapted for use as an egg crate, chicken coop, packing box or the like for shipping and storing goods and commodities. The invention will be described herein and referred to as for use as an egg crate but it will be understood that this is not intended as a limitation and is used generically.

The primary object of the invention is to provide a collapsible egg crate which collapses into a minimum of space while providing a substantial strong structure for protecting eggs when in erected condition.

A further object of the invention is to provide an egg crate of the class described above which can be collapsed and erected with a minimum of effort without the necessity of using special tools.

A still further object of the invention is to provide an egg crate of the class described above which is inexpensive to manufacture, simple to use, and which is effective in providing safe shipment for eggs.

Other objects and advantages will become apparent in the following specification when considered in the light of the attached drawings, in which:

Figure 1 is a perspective view of the invention shown in erected position.

Figure 2 is a perspective view of the invention shown in collapsed position.

Figure 3 is a vertical cross-section taken along the line 3—3 of Figure 1, looking in the direction of the arrows.

Figure 4 is a transverse cross-section taken along the line 4—4 of Figure 1, looking in the direction of the arrows.

Figure 5 is a longitudinal cross-section taken along the line 5—5 of Figure 2, looking in the direction of the arrows.

Figure 6 is a transverse cross-section taken along the line 6—6 of Figure 2, looking in the direction of the arrows.

Figure 7 is an enlarged fragmentary vertical cross-section taken along the line 7—7 of Figure 1, looking in the direction of the arrows.

Figure 8 is an enlarged sectional detail of the hinged side of the crate.

Figure 9 is an enlarged fragmentary vertical cross-section taken along the line 9—9 of Figure 1, looking in the direction of the arrows.

Referring now to the drawings in detail wherein like reference characters indicate like parts throughout the several figures, the reference numeral 10 indicates generally an egg crate constructed in accordance with the invention.

The egg crate 10 has a generally rectangular bottom frame, generally indicated at 11, including a pair of spaced horizontal longitudinally extending frame members 12, 13 connected by a pair of spaced parallel end frame members 14, 15. A generally rectangular bottom panel 16 is secured to the frame 11 in underlying relation thereto.

A generally rectangular top frame, indicated generally at 17, is formed from a pair of longitudinally extending spaced parallel frame members 18, 19 connected at their opposite ends by a pair of spaced parallel end frame members 20, 21. The end frame members 20, 21 are rabbeted at 22, 23, respectively, for reasons to be assigned. The frame member 18 is rabbeted at 24, for reasons to be assigned.

A side member 25 is secured to the frame member 13 by a hinge 26. A side member 27 is secured to the frame member 19 by a hinge 28. The side members 25, 27 are arranged in vertically aligned relation and are secured together by means of hinges 29.

A side member 30 is secured to the frame member 12 by means of a hinge 31. A side member 32 is secured to the frame member 18 by means of a hinge 33. The side members 30, 32 are arranged in aligned relation and are secured together by means of a hinge 34.

An end panel 35 has its lower end secured pivotally to the frame members 12, 13 by means of a pivot pin 36. The end panel 35 has the end thereof opposite the pivot pin 36 rabbeted at 37.

An end panel 38 is secured to the frame members 12, 13 by means of a pivot pin 39. The end of the panel 38 opposite the pivot 39 is rabbeted at 40. The end panel 38 swings to a position perpendicularly to the bottom panel 16 with the rabbet 40 engaging in the rabbet 22, and the end panel 35 swings to a position perpendicularly to the bottom panel 16 with the rabbet 37 engaging in the rabbet 23.

A top panel 41 is arranged between the frame members 18, 19 and the frame members 20, 21 lying in the same plane therewith. The top panel 41 is pivotally secured to the end frame members 20, 21 by means of dowel pins 42. The side edge of the top panel 41 opposite the pivots 42 is rabbeted at 43 cooperating with the rabbet 24 to support the edge of the top panel 41 opposite the dowel pins 42. The top panel 41 has a bore 44 in the middle thereof adjacent the rabbet 43 to serve as a finger opening to raise the top panel 41.

In the use and operation of the invention, the egg crate 10 in erected position, as illustrated in Figures 1, 3 and 4, is filled with eggs and shipped from one point to another. After the eggs are removed, the egg crate 10 is collapsed by folding the end panels 35, 38 to lie within the bottom frame 11, and then the side members 25, 27, 30, 32 are folded inwardly to the position illustrated in Figures 2, 5 and 6, with the top frame 17 positioned in close proximity to the bottom frame 11. In this position the egg crate 10 is shipped back to the egg producer for refilling and reshipping.

Having thus described the preferred embodiment of the invention, it should be understood that numerous structural modifications and adaptations may be resorted to without departing from the scope of the appended claim.

What is claimed is:

A collapsible container comprising a generally rectangular bottom frame, a bottom panel secured to the underside of said bottom frame, end panels hingedly secured to said frame adjacent the opposite ends thereof with said end panels being foldable from a position lying within the confines of said bottom frame to a position extending perpendicularly upwardly therefrom, a top frame engaging the upper ends of said end panels, side members hingedly secured to said bottom frame, additional side members hingedly secured to said top frame with the side members on said bottom frame hingedly secured to the side members on said top frame, said end panels having the respective free end edges thereof rabbeted, said top frame having the portions thereof engaging said end panels cooperatively rabbeted for interfitting relation therewith, and a top panel hingedly secured in said top frame, said top panel engaging between the upper end edges of said end panels maintaining said end panels in contact with said top frame with said container in erected condition, said top panel having an arcuate edge on the side of its hinged connection to said top frame, and being rabbeted on its opposite side edge, the inner portion of the corresponding top frame member being cooperatively rabbeted.

References Cited in the file of this patent

UNITED STATES PATENTS

| | | |
|---|---|---|
| 946,419 | Wyss | Jan. 11, 1910 |
| 1,071,458 | Pace | Aug. 26, 1913 |
| 1,111,407 | Schluembach | Sept. 22, 1914 |
| 1,254,482 | Davis | Jan. 22, 1918 |
| 2,219,978 | Caldwell | Oct. 19, 1940 |